United States Patent
Han et al.

(10) Patent No.: US 11,848,007 B2
(45) Date of Patent: *Dec. 19, 2023

(54) METHOD FOR OPERATING VOICE RECOGNITION SERVICE AND ELECTRONIC DEVICE SUPPORTING SAME

(71) Applicant: SAMSUNG ELECTRONICS CO., LTD., Suwon-si (KR)

(72) Inventors: Kyeonga Han, Suwon-si (KR); Soungmin Yoo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/863,706

(22) Filed: Jul. 13, 2022

(65) Prior Publication Data
US 2022/0343902 A1     Oct. 27, 2022

Related U.S. Application Data

(63) Continuation of application No. 16/964,409, filed as application No. PCT/KR2019/001220 on Jan. 29, 2019, now Pat. No. 11,404,048.

(30) Foreign Application Priority Data

Feb. 12, 2018   (KR) ........................ 10-2018-0016968

(51) Int. Cl.
*G10L 15/08*     (2006.01)

(52) U.S. Cl.
CPC .................. *G10L 15/083* (2013.01)

(58) Field of Classification Search
CPC ..................................................... G10L 15/083
(Continued)

(56) References Cited

U.S. PATENT DOCUMENTS

| 9,026,448 B2 | 5/2015 | Koivuniemi et al. |
| 9,557,961 B2 | 1/2017 | Park |

(Continued)

FOREIGN PATENT DOCUMENTS

| JP | 2003-295891 A | 10/2003 |
| KR | 10-1158434 B1 | 6/2012 |

(Continued)

OTHER PUBLICATIONS

International Search Report dated May 28, 2019 in corresponding International Patent Application No. PCT/KR2019/001220.

(Continued)

*Primary Examiner* — Susan I McFadden
(74) *Attorney, Agent, or Firm* — STAAS & HALSEY LLP

(57) ABSTRACT

A display apparatus including a display, a voice input receiver, a memory, a communication circuitry and a processor. The processor being configured to control the display to display at least one first identifier corresponding to at least one first component on a first area in the screen during a first time such that one of the at least one first identifier is selectable by a first user voice input, and control the display to display at least one second identifier corresponding to the at least one second component on a second area in the screen during a second time different from the first time, such that one of the at least one second identifier is selectable by a second user voice input.

20 Claims, 9 Drawing Sheets

(58) Field of Classification Search
USPC .......................................................... 704/231
See application file for complete search history.

(56) References Cited

U.S. PATENT DOCUMENTS

| | | | |
|---|---|---|---|
| 9,563,393 B2 | 2/2017 | Zhang | |
| 10,606,553 B2 | 3/2020 | Park | |
| 10,681,287 B2 | 6/2020 | Park | |
| 10,768,892 B2 | 9/2020 | Bang | |
| 10,788,955 B2 | 9/2020 | Jang | |
| 10,832,674 B2 | 11/2020 | Jaygarl | |
| 11,038,934 B1* | 6/2021 | Hansen | H04L 43/08 |
| 11,043,220 B1* | 6/2021 | Hansen | H04L 41/0893 |
| 11,183,193 B1* | 11/2021 | Hansen | H04L 67/12 |
| 11,361,756 B2* | 6/2022 | Smith | G10L 15/22 |
| 11,404,048 B2* | 8/2022 | Han | G10L 15/083 |
| 2012/0176313 A1 | 7/2012 | Ryu et al. | |
| 2013/0033422 A1 | 2/2013 | Choi et al. | |
| 2013/0033428 A1 | 2/2013 | Choi et al. | |
| 2014/0181865 A1 | 6/2014 | Koganei | |
| 2014/0196087 A1 | 7/2014 | Park et al. | |
| 2015/0310856 A1 | 10/2015 | Koganei | |

FOREIGN PATENT DOCUMENTS

| | | |
|---|---|---|
| KR | 10-2012-0080069 A | 7/2012 |
| KR | 10-2012-0135855 A | 12/2012 |
| KR | 10-2013-0018464 A | 2/2013 |

OTHER PUBLICATIONS

Written Opinion of the International Searching Authority dated May 28, 2019 in corresponding International Patent Application No. PCT/KR2019/001220.
U.S. Office Action issued U.S. Appl. No. 16/964,409 dated Nov. 24, 2021.
U.S. Notice of Allowance issued in U.S. Appl. No. 16/964,409 dated Mar. 29, 2022.
U.S. Appl. No. 16/964,409, filed Jul. 23, 2020, Kyeonga Han et al., Samsung Electronics Co., Ltd.

* cited by examiner

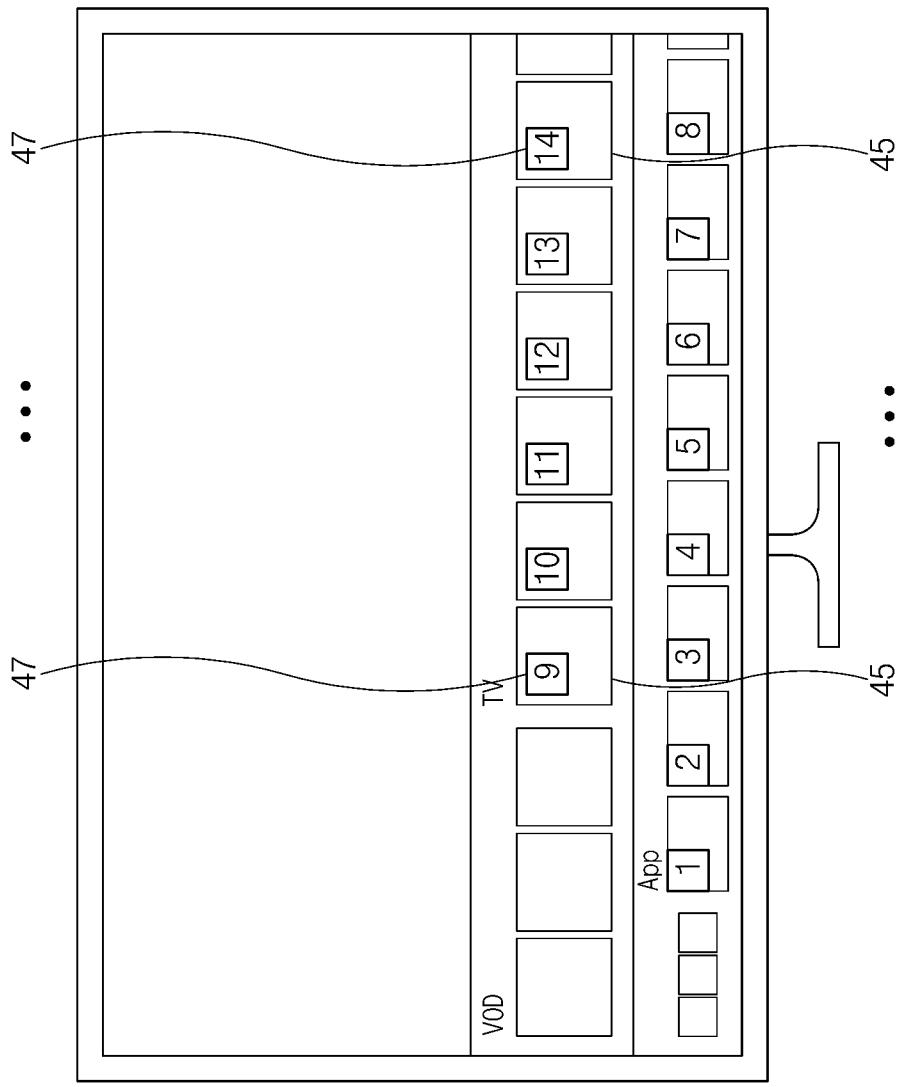

METHOD FOR OPERATING VOICE RECOGNITION SERVICE AND ELECTRONIC DEVICE SUPPORTING SAME

CROSS-REFERENCE TO RELATED APPLICATIONS

This application is a continuation of U.S. patent application Ser. No. 16/964,409, filed Jul. 23, 2020, which is a U.S. National Stage Application which claims the benefit under 35 U.S.C. § 371 of International Patent Application No. PCT/KR2019/001220 filed on Jan. 29, 2019, which claims foreign priority benefit under 35 U.S.C. § 119 of Korean Patent Application No. 10-2018-0016968 filed on Feb. 12, 2018 in the Korean Intellectual Property Office, the entire contents of which are incorporated herein by reference.

TECHNICAL FIELD

Various embodiments disclosed in the disclosure relate to a speech recognition technology based on an identifier utterance.

BACKGROUND ART

A recent electronic device proposes various input schemes as part of being oriented toward interaction with a user. For example, the electronic device may support a voice input scheme which receives voice data according to a user utterance based on running of a specified application program. In addition, the electronic device may support a speech recognition service of recognizing the received voice data to derive an intent of the user utterance and performing an operation corresponding to the derived intent of the user utterance.

DISCLOSURE

Technical Problem

As the speech recognition service is commercialized, various service functions ensuring user convenience are applied to an electronic device. For example, the electronic device may assign an explicit identifier to various screen components (e.g., an image, a text, or the like) on a screen being output. Furthermore, the electronic device may recognize a user voice input uttering the identifier to select or execute a corresponding screen component.

However, as the above service function collectively assigns identifiers to at least one screen component, when there are a large amount of screen components, the identifiers assigned to the screen components may hinder visibility or readability of the user for the screen of the electronic device.

Various embodiments disclosed in the disclosure are to provide an electronic device capable of addressing the above-mentioned problems or problems raised in the disclosure.

Technical Solution

In accordance with an aspect of the disclosure, an electronic device for supporting a speech recognition service is provided. The electronic device may include a communication device configured to communicate with at least one external device, a voice input receiving unit configured to receive a voice input according to a user utterance, a memory storing at least one application, a display configured to output at least one screen associated with operating a function of the electronic device, and a processor electrically connected with the communication device, the voice input receiving unit, the memory, and the display.

According to an embodiment, in controlling the display to output any screen, the processor may determine whether a specified condition is met for at least one screen component included in the any screen, may display a first identifier object supporting a user utterance for operating a first screen component in a first order on one region of the at least one first screen component meeting the specified condition, and may display a second identifier object supporting a user utterance for operating a second screen component in a second order on one region of the at least one second screen component which does not meet the specified condition.

In accordance with another aspect of the disclosure, a method for operating a speech recognition service in an electronic device is provided. The method may include outputting any screen associated with operating a function of the electronic device, determining whether a specified condition is met for at least one screen component included in the any screen, displaying a first identifier object supporting a user utterance for operating a first screen component in a first order on one region of the at least one first screen component meeting the specified condition, and displaying a second identifier object supporting a user utterance for operating a second screen component in a second order on one region of the at least one second component which does not meet the specified condition.

Advantageous Effects

According to various embodiments, convenience of a user utterance for operating a screen component may be improved by assigning an identifier capable of performing speech recognition to the screen component.

According to various embodiments, graphic congestion on a screen due to the providing of a large amount of identifiers may be prevented by first providing an identifier of a primary screen component among a plurality of screen components included in the screen.

In addition, various effects ascertained directly or indirectly through the disclosure may be provided.

DESCRIPTION OF DRAWINGS

FIGS. 4A, 4B, and 4C are drawings illustrating an importance determination example and an identifier display form for at least one screen component of an electronic device according to a third embodiment;

Figure 1:
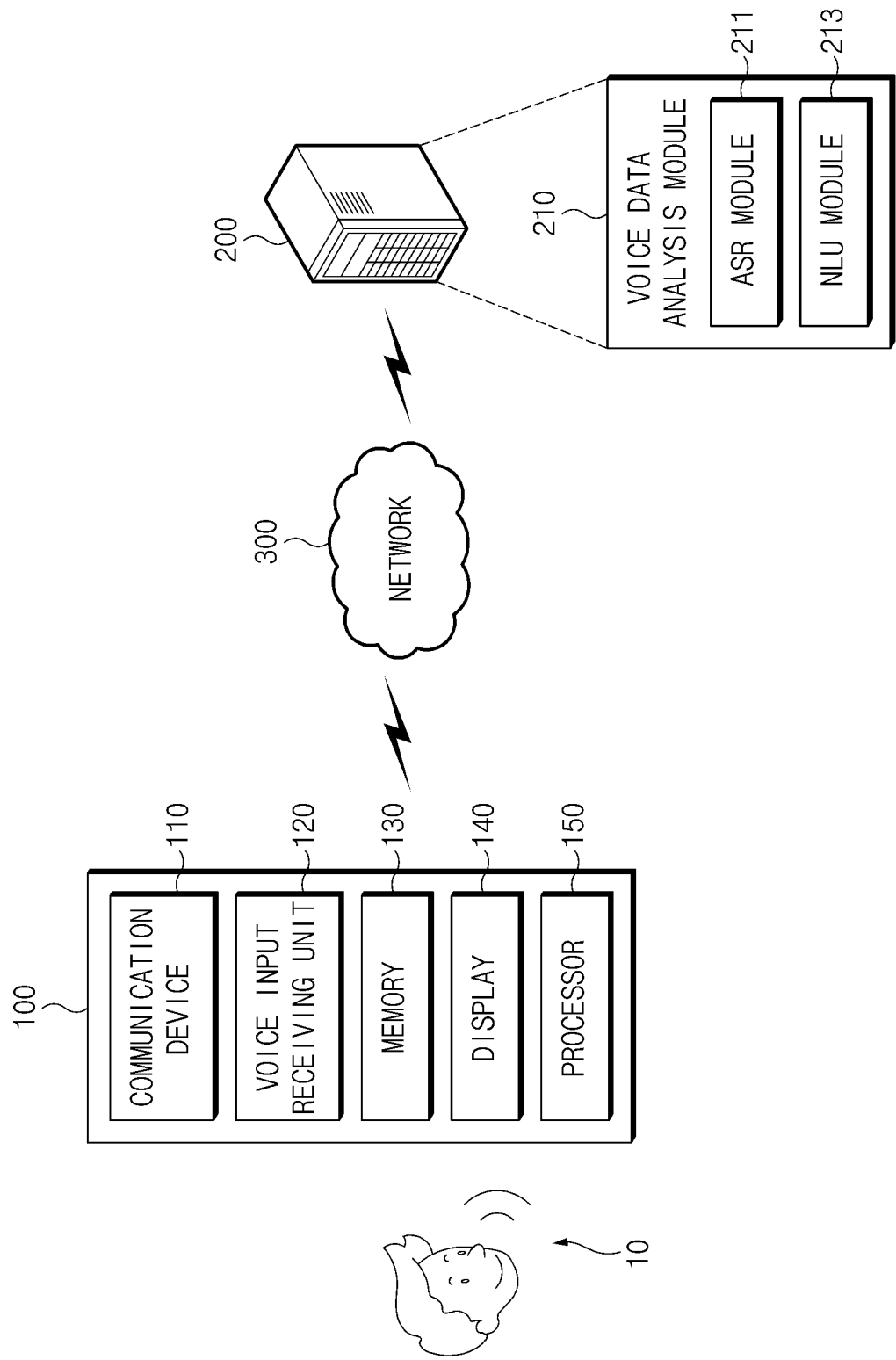
FIG. 1 is a drawing illustrating an operation environment and a configuration of an electronic device according to an embodiment.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure. With regard to description of drawings, similar denotations may be used for similar components.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HIVIDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a drawing illustrating an operation environment and a configuration of an electronic device according to an embodiment.

Referring to FIG. 1, an electronic device 100 may be linked with a specified external server 200 to construct an infra for operating a speech recognition service. For example, the electronic device 100 may establish a network 300 with the external server 200 and may transmit and receive at least one signal or data related to operating the speech recognition service with the external server 200 based on the network 300.

In an embodiment, the electronic device 100 may receive a user utterance 10 including a command or intent for operating a function (e.g., broadcast viewing, application execution, or the like) loaded into the electronic device 100. For example, the electronic device 100 may run a speech recognition application supporting operation of the speech recognition service. Furthermore, the electronic device 100 may receive voice data according to the user utterance based on a microphone enabled according to the running of the speech recognition application. In various embodiments, the microphone may be loaded into one region of the electronic device 100 or may be loaded into a controller (e.g., a remote controller) which interacts with the electronic device 100. The microphone loaded into the controller (e.g., the remote controller) may be enabled in response to a user input (e.g., press) applied to a specific button on the controller (e.g., the remote controller) and may transmit the received voice data to the electronic device 100. When receiving voice data according to the user utterance 10 from the controller (e.g., the remote controller), the electronic device 100 may run the speech recognition application.

In conjunction with processing the received voice data, the electronic device 100 may transmit the voice data to the external server 200 which takes charge of overall processing of the voice data. In an embodiment, the external server 200 may perform logical reasoning based on recognition or understanding for the voice data received from the electronic device 100 and may derive an intent of the user utterance 10. For example, the external server 200 may derive an intent of the user utterance 10 by analyzing information included in the received voice data using a linguistic model or algorithm. The external server 200 may transmit a signal, data, or a command related to the derived intent of the user utterance 10 to the electronic device 100. The electronic device 100 may process the signal, the data, or the command received from the external server 200 to respond to the user utterance 10.

For example, the electronic device 100 and the external server 200 may perform a series of processes for providing a speech recognition-based service. For example, the electronic device 100 may receive and transmit voice data according to the user utterance 10 to the external server 200, and the external server 200 may recognize the voice data to derive an intent of the user utterance 10. Furthermore, the external server 200 may transmit a signal, data, or a command related to the intent of the user utterance 10 to the electronic device 100 to support a response of the electronic device 100 to the user utterance 10.

According to an embodiment, on the above-mentioned process, the electronic device 100 may provide a specified graphic user interface for supporting convenience or clarity for a user utterance related to operating a function of the electronic device 100. For example, the electronic device 100 may provide an identifier object of a corresponding component to one region of the at least one component included in an output screen. In various embodiments, the component may be understood as being collectively referred to as a screen element such as content (e.g., an image, a text, an icon, a symbol, or the like) included in the output screen, an object (e.g., a tap button, a link button, or the like), and/or a specific field (e.g., an input field or the like), and the component may be referred to as an element.

The electronic device 100 may receive voice data of the user who utters the identifier object and may process the voice data based on interaction with the external server 200 to select or execute a component corresponding to the identifier object uttered from the user. In this operation, the electronic device 100 may determine priorities in consideration of operation importance, operation ease, or the like for at least one component included in the output screen and may sequentially provide identifier objects for the at least one component depending on the priorities. Hereinafter, a description will be given of various embodiments related to providing an identifier object of the electronic device 100 and function operations of components implementing them.

According to an embodiment, the electronic device 100 may include at least one of a communication device 110, a voice input receiving unit 120, a memory 130, a display 140, or a processor 150. In various embodiments, the electronic device 100 may exclude at least one of the above-mentioned components or may additionally include another component. For example, the electronic device 100 may further include a power supply device (e.g., a battery) for supplying a drive power to the components, a camera device for capturing an image (e.g., a still image or a video) for an area around the electronic device 100, a sensor device (e.g., a proximity sensor, an illumination sensor, or the like) for sensing a variety of information, or the like. Alternatively, the electronic device 100 may further include components of an electronic device 701, which will be described below with reference to FIG. 7. At least some of function operations of components of the electronic device 100, which will be described below, may be understood as being implemented under control of the processor 150.

The communication device 110 may support communication between the electronic device 100 and at least one external device (e.g., the external server 200, a broadcast server, a controller (a remote controller), and/or the like). For example, the communication device 110 may construct the network 300 according to a defined protocol with the at least one external device and may access the network 300 based on wired communication or wireless communication, thus transmitting and receiving a signal or data with the at least one external device.

The voice input receiving unit 120 may receive voice data (or a voice signal) according to the user utterance 10. In an embodiment, the voice input receiving unit 120 may include at least one microphone device loaded into one region of the electronic device 100 and may be triggered and enabled according to running of a specific application (e.g., the speech recognition application) or may be controlled in a state always enabled (e.g., always on microphone). Alternatively, the voice input receiving unit 120 may include at least one microphone device loaded into a controller (e.g., a remote controller) which interacts with the electronic device 100. The at least one microphone device loaded into the controller may transmit the received voice data (or voice signal) to the electronic device 100 using the network 300. In various embodiments, the at least one microphone device loaded into the electronic device 100 or the controller may be at least partially exposed to the outside of the electronic device 100 or the controller in conjunction with reception efficiency of the voice data.

The memory 130 may store at least one data associated with operating the electronic device 100 or may store a command associated with function operations of the components of the electronic device 100. For example, the memory 130 may store voice data received via the voice input receiving unit 120 or may store broadcast service information (e.g., channel information, program information, content information, or the like) received from a specified broadcast server. Alternatively, the memory 130 may store at least one application which is loaded in a preloaded form when the electronic device 100 is manufactured or is downloaded in the form of a third party from an online market (e.g., an app store). According to an embodiment, the at least one application may include a speed recognition application supporting operation of a speech recognition service.

The display 140 may output various screens. For example, the display 140 may output primary screens (e.g., a main interface screen, a home screen, a broadcast program screen, a system configuration screen, and the like) of the electronic device 100. Alternatively, the display 140 may output a screen where an application included in the electronic device 100 is running. Alternatively, the display 140 may output an object (e.g., a pointer) specifying motion of an input device (e.g., a mouse or the like) wiredly or wirelessly connected with the electronic device 100. In various embodiments, the display 140 may be implemented as a touchscreen display including a display panel, a cover glass, and a touch panel (or a touch sensor). The display panel may receive a driving signal corresponding to image information at a specified frame rate and may output a related screen based on the driving signal. The cover glass may be disposed on an upper part of the display panel to transmit light according to a screen output of the display panel. Furthermore, a user input (e.g., touch, drag, press, hovering, or the like) by a user's body (e.g., a finger) may be applied to at least one region of the cover glass. The touch panel may detect a signal according to a user input (e.g., a capacitive type, a resistive type, an infrared type, an ultrasonic type, or the like) to output an electrical signal and may deliver information about the output electrical signal to the processor 150.

The processor 150 may be electrically or operatively connected with at least one component of the electronic device 100 to perform control, communication, calculation, data processing, or the like for the component. For example, the processor 150 may transmit voice data according to the user utterance 10 received via the voice input receiving unit 120 to the external server 200 and may receive and process a signal, data, or a command according to analysis of the voice data from the external server 200. According to various embodiments, the processor 150 may preprocess voice data received via the voice input receiving unit 120 to support high-reliability speech recognition of the external server 200. For example, the processor 140 may preprocess at least one of adaptive echo cancellation for removing an echo included in voice data, noise suppression for filtering voice data to suppress a background noise, automatic gain control for changing a volume or frequency characteristic by applying a gain value to voice data, or end-point detection for detecting an end-point of the user utterance 10 to determine an interval of voice data.

In an embodiment, the processor 150 may control the display 140 depending on user control or specified scheduling information to output a related screen. In this regard, the processor 150 may identify at least one component included in the output screen and may display an identifier (e.g., number, character, or the like) object supporting a user utterance for selecting or executing the corresponding component on one region of the at least one component. In this operation, the processor 150 may first display the identifier object on at least one component meeting a specified condition among the at least one identified component and may sequentially display the identifier objects on another component (e.g., a component which does not meet the specified condition) as a specified time elapses. A function operation of the processor 150, which is associated with this, will be described below with reference to the accompanying drawings.

According to an embodiment, the external server 200 may include a voice data analysis module 210 for analyzing voice data received from the electronic device 100 to derive an intent of the user utterance 10 and transmitting a signal, data, or a command corresponding to the intent of the user utterance 10 to the electronic device 100. The voice data analysis module 210 may include at least one of, for example, an automatic speech recognition (ASR) module 211 or a natural language understanding (NLU) module 213. In various embodiments, at least one module (e.g., the ASR module 211 or the NLU module 213) included in the voice data analysis module 210 may be separately implemented or may be at least partially integrated and implemented, and may be configured with hardware or software.

The ASR module 211 may recognize voice data received from the electronic device 100 to convert the voice data into text data. For example, the ASR module 211 may convert voice data into text data using an acoustic model including at least one information related to utterance or vocalization or a language model including at least one unit phoneme information and combination information of the unit phoneme information. The ASR module 211 may deliver the converted text data to the NLU module 213.

The NLU module 213 may derive an intent of the user utterance 10 associated with the voice data, based on the text data delivered from the ASR module 211. In this regard, the NLU module 213 may divide the text data into grammatical units (e.g., a word, a phrase, a morpheme, or the like) and may analyze a grammatical element or a linguistic feature for each unit to determine a meaning of the text data, thus deriving an intent of the user utterance 10. The NLU module 213 may generate and transmit a signal, data, or a command related to the derived intent of the user utterance 10 to the electronic device 100. In various embodiments, the NLU module 213 may map the text data delivered from the ASR module 211 and the derived intent of the user utterance 10 to be stored in an index or database. Thereafter, when receiving any text data from the ASR module 211, the NLU module 213 may identify the same or similar text data to the any text data on the index or database and may obtain an intent of the user utterance 10 mapped to the identified text data.

According to various embodiments, at least some components (e.g., the voice data analysis module 210) of the above-mentioned external device 200 may be included in the electronic device 100. Thus, the electronic device 100 may act as the above-mentioned function operation of the external device 200 to analyze voice data according to the user utterance 10 and derive and process an intent of the user utterance 10.

FIGS. 2, 3, 4A, to 4C are drawings illustrating an importance determination example and an identifier display form for at least one screen component of an electronic device according to various embodiments. The importance of a screen component described with reference to FIGS. 2 and 3 and FIGS. 4A to 4C may be understood as being determined based on operation importance of the screen component.

In an embodiment, a processor (150 of FIG. 1) of an electronic device 100 may set a main region for at least one primary screen (e.g., a main interface screen, a home screen, a system configuration screen, or the like) of the electronic device 100, which is specified according to user control. In other words, the main region on the at least one primary screen may be understood as a region previously defined by the processor 150. In this regard, the at least one primary screen may include a screen component such as at least one category menu and/or at least one content preview (or a content list), which is disposed according to a defined platform. In an embodiment, the processor 150 may set a screen component region associated with an image (e.g., still image or video) content preview (or an image content list) included in the primary screen as the main region.

Figure 2:
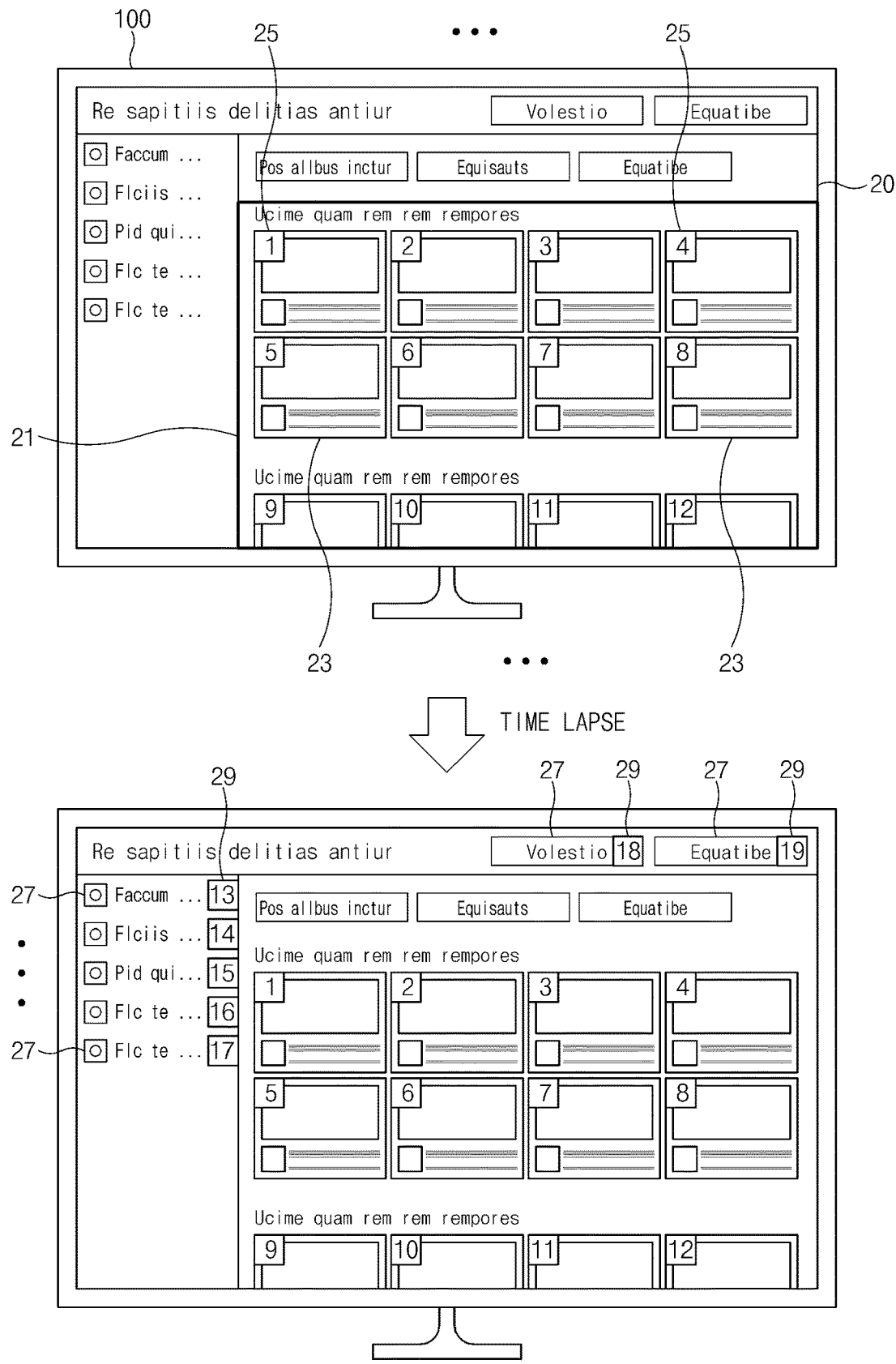
FIG. 2 is a drawing illustrating an importance determination example and an identifier display form for at least one screen component of an electronic device according to a first embodiment.

In conjunction with the above-mentioned contents, referring to FIG. 2, in an operation of outputting any screen in response to user control or specified scheduling information, the processor 150 may determine whether the any screen corresponds to at least one specified primary screen 20 (e.g., a main interface screen, a home screen, a system configuration screen, or the like). When it is determined that the any screen output on a display (140 of FIG. 1) is the at least one specified primary screen 20, the processor 150 may identify a main region 21 previously defined for the corresponding primary screen 20. The processor 150 may determine at least one screen component 23 (e.g., an image content preview or an image content list) included in the identified main region 21 as a primary (or high-importance) screen component among at least one screen component included in the primary screen 20. Thus, the processor 150 may detect coordinate information of each of the at least one screen component 23 included in the main region 21 and may display identifier objects 25, each of which has different identification information (e.g., a number or the like), in a first order on each detected coordinates.

In an embodiment, the processor 150 may display the identifier object 25 in a first order on each of the primary screen components 23 (or the screen components 23 included in the main region 21) and may identify whether a voice input according to a user utterance occurs during a specified time range. When the voice input does not occur during the specified time range, the processor 150 may display an identifier object 29 in a second order on one region of at least one screen component 27 (e.g., a category menu) outside the main region 21. At this time, the processor 150 may maintain or clear the at least one identifier object 25 displayed in the first order in the main region 21.

According to an embodiment, in an operation of displaying the identifier object 29 on the at least one screen component 27 outside the main region 21, when the identifier object 25 displayed on the at least one screen component 23 in the main region 21 is maintained, the processor 150 may assign a specified display effect (e.g., an increase in size, ON/OFF, motion, or the like) to the identifier object 25 in the main region 21, which is displayed in the first order. According to various embodiments, the identifier object 29 displayed on the screen component 27 outside the main region 21 may include identification information (e.g., a number or the like) linked (or subsequent) to the identifier object 25 displayed on the screen component 23 in the main region 21. Alternatively, the identifier object 29 displayed on the screen component 27 outside the main region 21 may include identification information (e.g., a character or the like) of different attributes.

In an embodiment, the processor 150 may receive voice data of the user who utters the identifier object 25 and/or 29 displayed on the at least one screen component 23 and/or 27 on the any screen. In this case, the processor 150 may transmit the voice data to an external server (200 of FIG. 1) and may respond to a user utterance based on recognition information about the voice data received from the external server 200. For example, the processor 150 may focus, select, or execute a screen component having coordinate information corresponding to an identifier object uttered by the user. Alternatively, the processor 150 may move an object (e.g., a pointer) associated with an input device (e.g., a mouse or the like) connected with the electronic device 100 to a screen component region corresponding to the identifier object uttered by the user.

According to various embodiments, it may be determined whether the above-mentioned identifier object 25 and/or 29 is displayed according to a user input applied to a controller (e.g., a remote controller) which interacts with the electronic device 100. For example, when a user input (e.g., press) is applied to a specific button (e.g., a button associated with enabling a microphone loaded into the controller) on the controller (e.g., the remote controller), the processor 150 may receive a user input signal from the controller (e.g., the remote controller) and may display the identifier object 25 and/or 29. In response, when the user input is not applied to the specific button on the controller (e.g., the remote controller), the processor 150 may exclude the displaying of the identifier object 25 and/or 29.

As an example of setting another main region, in an operation of outputting the any screen, the processor 150 may identify a screen component overlapped at least partially with an object (e.g., a pointer) which is focused by the controller (e.g., the remote controller) connected with the electronic device 100 on the any screen or specifies motion of an input device (e.g., a mouse or the like). The processor 150 may determine a specified region range as the main region on the basis of the screen component which is focused or overlapped with the object and may determine at least one screen component included in the main region as a primary (or high-importance) screen component. Thus, the identifier object may be displayed in order of priority (e.g., in a first order) on at least one screen component adjacent to the screen component which is focused or is overlapped with the object. Alternatively, the processor 150 may determine at least one point spaced apart from the screen component, which is focused or is overlapped with the object, at a specified distance and may determine a specified region range as the main region on the basis of the determined point. In this case, the processor 150 may display the identifier object in order of priority (e.g., in a first order) on a screen component spaced apart from the screen component, which is focused, where the object is located.

In an embodiment, at least some of the function operations of the processor 150, which are described with reference to FIG. 2, are applicable to an embodiment, which will be described with reference to FIG. 3, FIGS. 4A to 4C, or FIG. 5 below, in a similar manner. For example, in the embodiment of FIG. 3, FIGS. 4A to 4C, or FIG. 5, the processor 150 may display an identifier object in a first order on a screen component satisfying a specified condition and may display an identifier object in a second order on a screen component which does not satisfy the specified condition. When displaying the identifier object in the second order, the processor 150 may maintain or clear the identifier object displayed in the first order and may assign a specified display effect (e.g., an increase in size, ON/OFF, motion, or the like) to the maintained identifier object. Alternatively, the processor 150 may focus, select, or execute a screen component corresponding to an uttered identifier object depending on a user voice input uttering the identifier object or may move an object (e.g., a mouse pointer) supporting a user input (e.g., click) to a screen component region. Alternatively, the processor 150 may display the identifier object on a screen output on a display (140 of FIG. 1) or may exclude the displaying, depending on whether there is a user input (e.g., press) applied to a specific button on the controller (e.g., the remote controller) which interacts with the electronic device 100.

Figure 3:
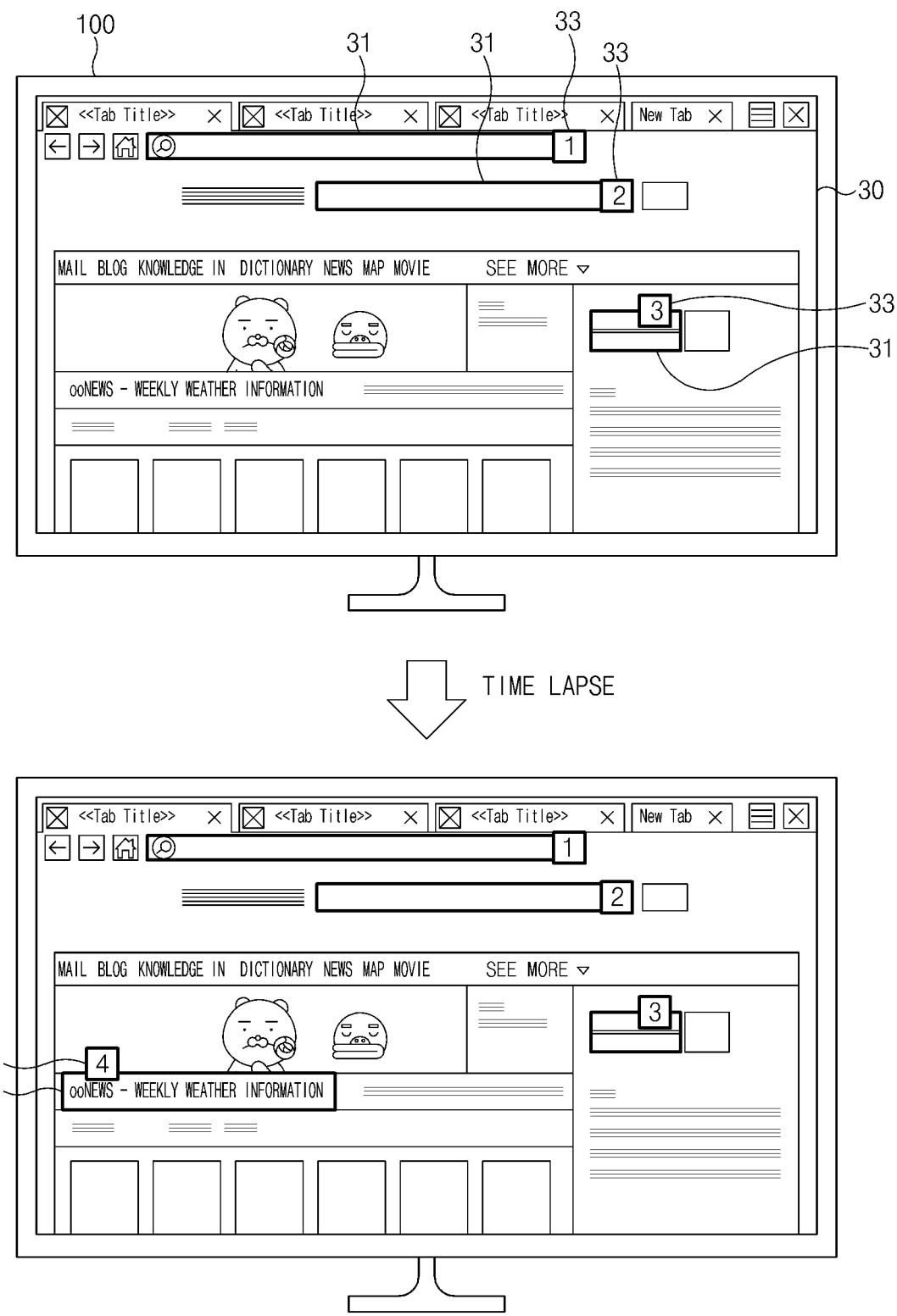
FIG. 3 is a drawing illustrating an importance determination example and an identifier display form for at least one screen component of an electronic device according to a second embodiment.

Referring to FIG. 3, the processor 150 may output a screen 30 where an application is running on a screen of the display 140, depending on running of the any application (e.g., an application entailing search, log-in, or the like). The processor 150 may identify at least one input field 31 (e.g., a search window, an ID input window, a password input window, or the like) associated with a typing input of the user among at least one component included in the screen 30. In this case, the processor 150 may determine at least one screen component corresponding to the at least one input field 31 as a primary (or high-importance) screen component and may display the identifier object 33 in a first order with reference to coordinate information of the determined primary screen component. According to an embodiment, when the identifier object 33 displayed on the screen component corresponding to the input field 31 is uttered by the user, the processor 150 may locate a cursor supporting a user input (e.g., typing) on the input field 31 and may output a software input panel (SIP) keyboard on one region of the screen of the display 140. In an embodiment, similar to contents described above, the processor 150 may display the identifier object 33 in a first order on the at least one primarily determined screen component (e.g., the input field 31). When a voice input according to a user utterance does not occur during a specified time range, the processor 150 may display an identifier object 37 in a second order on at least one other screen component 35 (e.g., a news headline text or the like) except for the primary screen component. In FIG. 3, the at least one other screen component exemplified as the news headline text may be according to an embodiment. The at least one other screen component may include various types of screen components except for the primarily determined screen component (e.g., the input field 31) among the at least one screen component included in the screen 30 where the application is running. Furthermore, there may be no limitation in a type or the number of the at least one other screen component.

Figure 4A:
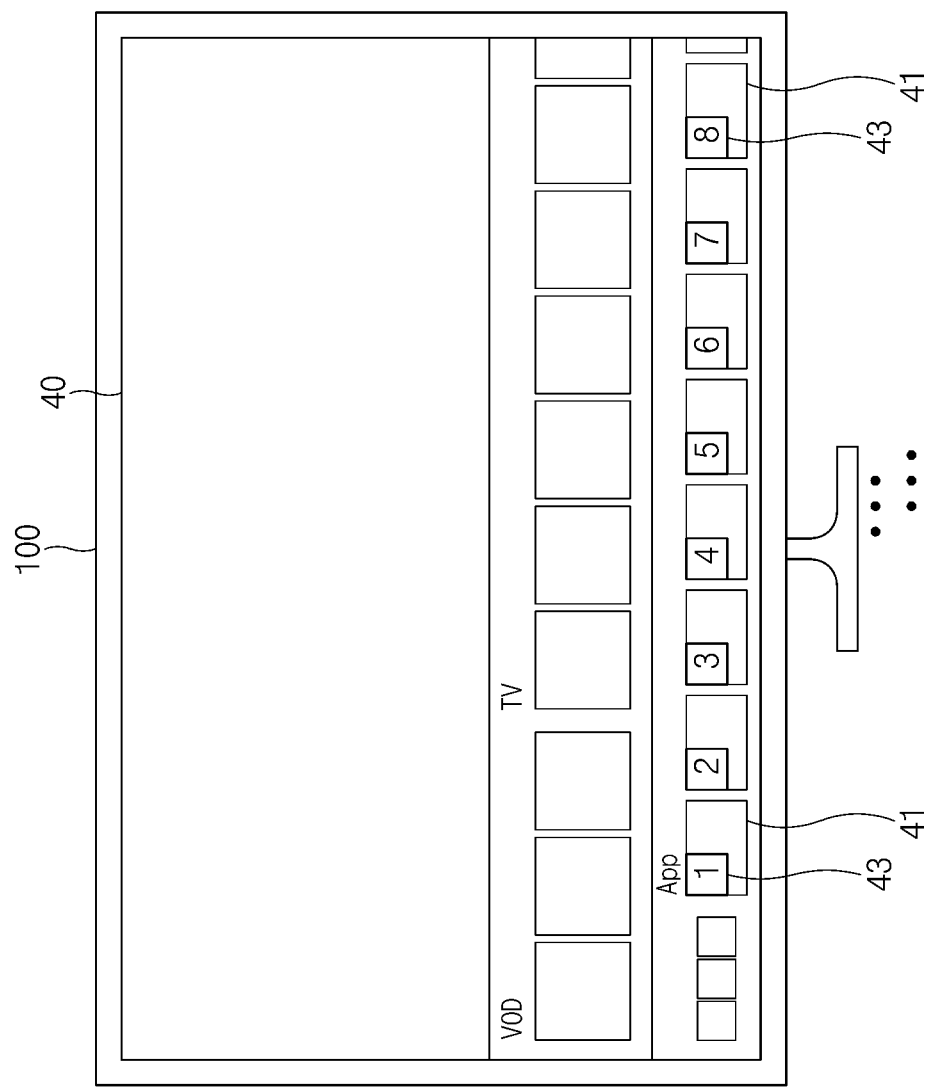
Figure 4C:
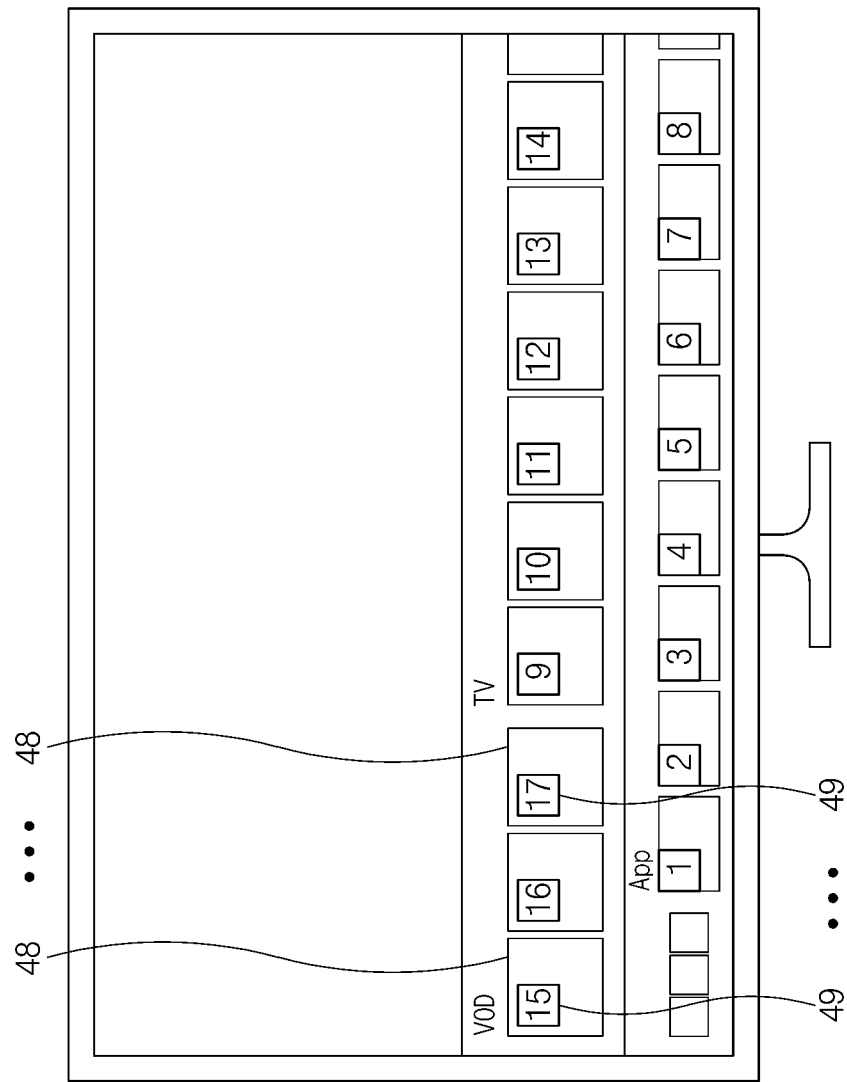

Referring to FIGS. 4A, 4B, and 4C, the processor 150 may output a screen 40 displaying an application list, a TV program list, and/or a VOD program list, which is included in the electronic device 100, in response to user control (e.g., a specific menu operation on the controller (remote controller)). In this regard, the primary screen component determination of the processor 150 for the screen 40 may be performed based on content attributes priority information previously set by the user. When the content attributes priority set by the user is an order of an application, a TV program, and a VOD program, the processor 150 may determine screen components 41 (e.g., an application name, an application icon, or the like) of an application list associated with the application as primary (or high-importance) screen components among at least one screen component included in the screen 40. Thus, the processor 150 may display an identifier object 43 in a first order on one region of each of the screen components 41 corresponding to the application list. When a specified time elapses from the displaying of the identifier object 43 or when a voice input according to a user utterance does not occur during a specified time, the processor 150 may display identifier objects 47 in a second order on screen components 45 (e.g., a TV program list) associated with a TV program set in an order subsequent to the application. In response, when a specified time elapses after displaying the identifier objects 47 in the second order or when a voice input does not occur during the specified time range, the processor 150 may display identifier objects 49 in a third order on screen components 48 associated with a VOD program set in an order subsequent to the TV program.

Figure 5:
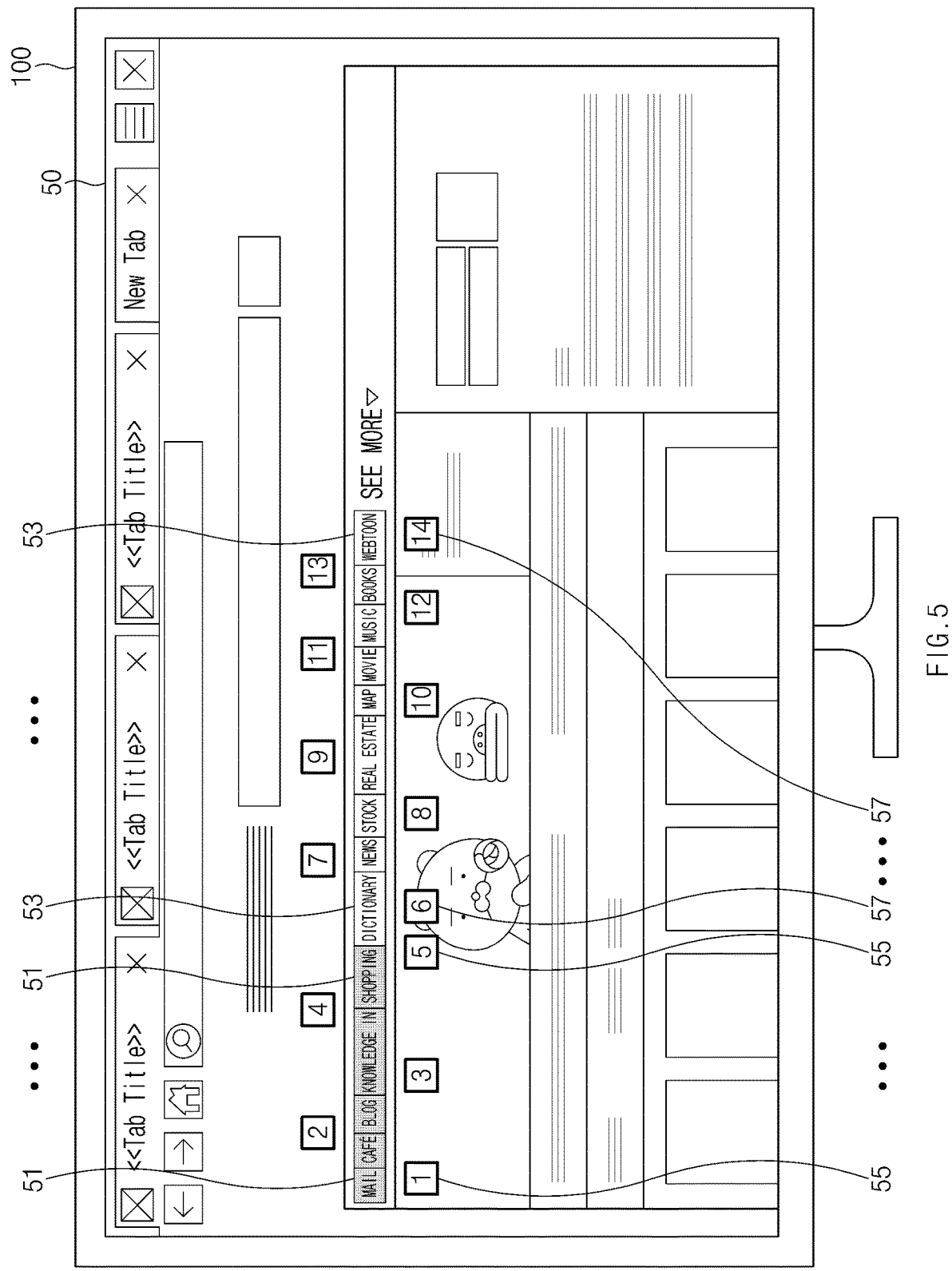
FIG. 5 is a drawing illustrating an importance determination example and an identifier display form for at least one screen component of an electronic device according to a fourth embodiment.

FIG. 5 is a drawing illustrating an importance determination example and an identifier display form for at least one screen component of an electronic device according to another embodiment. The importance of a screen component described with reference to FIG. 5 may be understood as being determined based on operation ease of the screen component.

Referring to FIG. 5, a processor (150 of FIG. 1) of an electronic device 100 may identify a screen component 51 and/or 53 (e.g., a tap button) of less than a specified size among at least one screen component included in a screen 50 (e.g., an application execution screen, at least one specified primary screen, or the like) being output on a display (140 of FIG. 1). According to an embodiment, the processor 150 may display identifier objects 55 (identification information 1 to 5) and/or identifier objects 57 (identification information 6 to 14) in a first order on the screen component 51 and/or 53 of less than the specified size, with regard to control of the screen component 51 and/or 53 of less than the specified size, which is not easy by the user.

According to various embodiments, the screen component 51 and/or 53 of less than the specified size may be identified as being plural in number on the screen 50, and at least some of the plurality of screen components may include different sizes or background colors. In this case, the processor 150 may assign a specified display effect (e.g., an increase in size, ON/OFF, motion, or high luminance, or the like) to an identifier object (e.g., 55) displayed on a screen component (e.g., 51) which has a minimum size or a background color which is not easy to be visible among the plurality of screen components.

According to various embodiments, the processor 150 may consider determination of a primary screen component according to operation importance (e.g., a screen component included in a main region (21 of FIG. 2), a screen component corresponding to an input field (31 of FIG. 3), a screen component (41 of FIG. 4) of content attributes set in order of priority from the user, or the like) described with reference to FIG. 2, FIG. 3, or FIGS. 4A to 4C and determination of a primary screen component (e.g., the component (51 and/or 53 of FIG. 5) of less than the specified size, the component (51 of FIG. 5) of a background color which is not easy to be visible, or the like) according to operation ease described with reference to FIG. 5 in an overall manner to determine the primary screen component. For example, when the screen being output on the display 140 of the electronic device 100 includes the screen component corresponding to the input field and the screen component of less than the specified size (or the screen component of the background color which is not easy to be visible), the processor 150 may prioritize the screen component of less than the specified size (or the screen component of the background color which is not easy to be visible) primarily determined according to operation ease to display an identifier object in a first order on the screen component of less than the specified size (or the screen component of the background color which is not easy to be visible).

According to various embodiments, the processor 150 of the electronic device 100 may determine a primary screen component on the screen output on the display 140 in various manners, other than the determination of the priority of the screen component according to the satisfaction of the specified condition, which is described in detail with reference to FIG. 2, FIG. 3, FIGS. 4A to 4C, or FIG. 5. For example, the processor 150 may collect operation history information of the user about at least one screen component included in the screen with reference to log information stored in a memory (130 of FIG. 1), may determine a screen component operated over a specified threshold number of times as a primary screen component, and may display an identifier object in a first order. The operation history for the screen component may refer to information about a history where a screen component is selected, executed, or played by a controller (e.g., a remote controller) or an input device (e.g., a mouse or the like), which interacts with the electronic device 100. According to another embodiment, in an operation of outputting any screen on the display 140, the processor 150 may track a line of sight of the user using a camera device loaded into one region of the electronic device 100 (e.g., a front region of the electronic device 100) during a time before a voice input according to a user utterance occurs. The processor 150 may determine a screen component of a region where the tracked line of sight of the user is gazed over a specified time as a primary screen component and may display an identifier object in a first order.

An electronic device for supporting a speech recognition service according to the above-mentioned various embodiments may include a communication device for communicating with at least one external device, a voice input receiving unit for receiving a voice input according to a user utterance, a memory for storing at least one application, a display for outputting at least one screen associated with operating a function of the electronic device, and a processor electrically connected with the communication device, the voice input receiving unit, the memory, and the display.

According to various embodiment, in controlling the display to output any screen, the processor may determine whether a specified condition is met for at least one screen component included in any screen, display a first identifier object supporting a user utterance for operating a first screen component in a first order on one region of the at least one first screen component meeting the specified condition, and may display a second identifier object supporting a user utterance for operating a second screen component in a second order on one region of the at least one second screen component which does not meet the specified condition.

According to various embodiments, when a voice input according to a user utterance does not occur during a specified time after displaying the first identifier object in the first order, the processor may display the second identifier object in the second order.

According to various embodiments, in displaying the second identifier object in the second order, the processor may maintain or exclude the displaying of the first identifier object displayed in the first order.

According to various embodiments, in displaying the second identifier in the second order, when maintaining the displaying of the first identifier object displayed in the first order, the processor may assign a specified display effect to the first identifier object.

According to various embodiments, the processor may receive a voice input of a user who utters at least one of the first identifier object or the second identifier object to transmit related first data to an external server, may receive second data associated with recognizing the first data from the external server, and may process the second data to select or execute a screen component corresponding to an identifier object uttered from the user.

According to various embodiments, when receiving a signal for a user input applied to a specific button on the external device from the external device interacting with the electronic device, the processor may display the first identifier object and the second identifier object.

According to various embodiments, as at least a portion of determining whether the specified condition is met, when the any screen corresponds to at least one specified primary screen, the processor may determine at least one screen component included in a main region previously set for the at least one primary screen as the first screen component meeting the specified condition.

According to various embodiments, as at least a portion of determining whether the specified condition is met, the processor may determine at least one screen component corresponding to an input field associated with a typing input on the any screen as the first screen component meeting the specified condition.

According to various embodiments, when receiving a voice input of a user who utters the first identifier object displayed on the at least one screen component corresponding to the input field, the processor may output a software input panel (SIP) keyboard on one region of the any screen.

According to various embodiments, as at least a portion of determining whether the specified condition is met, the processor may determine content attributes for the at least one screen component included in the any screen and may determine a screen component corresponding to content attributes of a predetermined priority as the first screen component meeting the specified condition.

According to various embodiments, as at least a portion of determining whether the specified condition is met, the processor may determine a screen component of less than a specified size among the at least one screen component included in the any screen as the first screen component meeting the specified condition.

According to various embodiments, as at least a portion of determining whether the specified condition is met, the processor may determine a screen component operated over a specified threshold number of times as the first screen component meeting the specified condition, with reference to a history of operating the at least one screen component included in the any screen.

Figure 6:
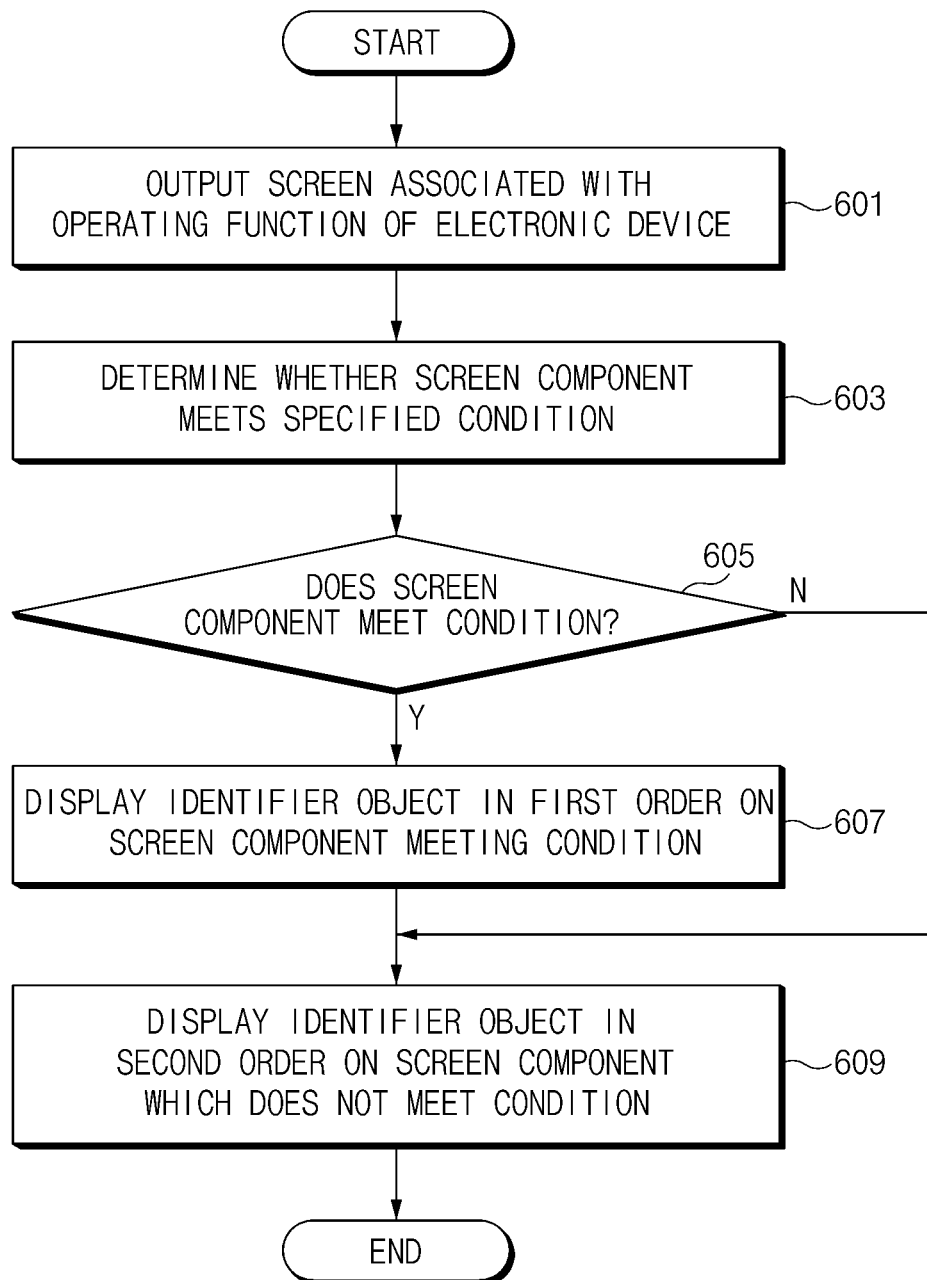
FIG. 6 is a drawing illustrating a method for operating a speech recognition method in an electronic device according to an embodiment.

FIG. 6 is a drawing illustrating a method for operating a speech recognition method in an electronic device according to an embodiment.

Referring to FIG. 6, in operation 601, a processor (150 of FIG. 1) of an electronic device (100 of FIG. 1) may output a screen (e.g., a main interface, a home screen, a broadcast program screen, a system configuration screen, an application execution screen, or the like) associated with operating a function of the electronic device 100 in response to user control or specified scheduling information.

In operation 603, the processor 150 may identify at least one screen component included in the output screen and may determine whether a specified condition is met for the at least one identified screen component. The screen component may be understood as being collectively referred to as, for example, a screen element such as content (e.g., an image, a text, an icon, a symbol, or the like) included in the output screen, an object (e.g., a tap button, a link button, or the like), and/or a specified field (e.g., an input field or the like).

In an embodiment, the processor 150 may determine at least one screen component included in a main region previously defined for the screen as a screen component meeting the specified condition. In this regard, the main region may be previously set as a screen component region associated with an image (still image or video) content preview (or an image content list) among at least one screen component included in the screen. Alternatively, the processor 150 may determine a specified region range as the main region on the basis of a screen component overlapped at least partially with an object (e.g., a pointer) which is focused by a controller (e.g., a remote controller) connected with the electronic device 100 or specifies motion of an input device (e.g., a mouse or the like). In another embodiment, the processor 150 may determine at least one screen component, corresponding to an input field (e.g., a search window, an ID input window, a password input window, or the like) on the screen, as the screen component meeting the specified condition. In another embodiment, the processor 150 may determine a screen component, corresponding to content attributes of a priority previously set by a user, among at least one screen component included in the screen as the screen component meeting the specified condition. In another embodiment, the processor 150 may determine a screen component of less than a specified size as the screen component meeting the specified condition on the screen. In another embodiment, the processor 150 may determine a screen component, having a history operated over a specified threshold number of times, among at least one screen component included in the screen as the screen component meeting the specified condition.

When it is determined that at least some of the at least one screen component included in the output screen meet at least one of the above-mentioned conditions in operation 605, in operation 607, the processor 150 may display a first identifier object in a first order on a screen component meeting the condition. The identifier object may be referred to as, for example, a graphic user interface supporting a user utterance for operating a corresponding screen component and may include identification information (e.g., a number, a character, or the like).

In operation 609, when the voice input according to the user utterance does not occur during the specified time range after displaying the first identifier object in the first order, the processor 150 may display a second identifier object in a second order on at least one screen component which does not meet the specified condition.

According to the above-mentioned contents, the processor 150 may display an identifier object first (e.g., in the first order) on at least one screen component meeting the specified condition among at least one screen component included in the screen being output and may display an identifier object sequentially (e.g., in a second order) on at least one screen component which does not meet the condition when the voice input does not occur during the specified time.

According to an embodiment, the display 150 may focus, select, or execute a screen component corresponding to an uttered identification object, depending on a user voice input uttering the displayed identifier object (e.g., the first identifier object or the second identifier object) or may move an object (e.g., a mouse) supporting a user input (e.g., click) to a screen component region.

According to various embodiment, a method for operating a speech recognition service in an electronic device may include outputting any screen associated with operating a function of the electronic device, determining whether a specified condition is met for at least one screen component included in the any screen, displaying a first identifier supporting a user utterance for operating a first screen component in a first order on one region of the at least one first screen component meeting the specified condition, and displaying a second identifier object supporting a user utterance for operating a second screen component in a second order on one region of the at least one second component which does not meet the specified condition.

According to various embodiments, the displaying of the second identifier object in the second order may include, when a voice input according to a user utterance does not occur during a specified time after displaying the first identifier object in the first order, displaying the second identifier object in the second order.

According to various embodiments, the method for operating the speech recognition service may further include at least one of receiving a voice input of a user who utters at least one of the first identifier object or the second identifier object to transmit related first data to an external server, receiving second data associated with recognizing the first data from the external server, and processing the second data to select or execute a screen component corresponding to an identifier object uttered from the user.

According to various embodiments, the displaying of the first identifier object in the first order may include, when the any screen corresponds to at least one specified primary screen, determining at least one screen component included in a main region previously set for the at least one primary screen as the first screen component meeting the specified condition.

According to various embodiments, the displaying of the first identifier object in the first order may include determining at least one screen component corresponding to an input field associated with a typing input on the any screen as the first screen component meeting the specified condition.

According to various embodiments, the displaying of the first identifier object in the first order may include determining content attributes for at least one screen component included in the any screen and determining a screen component corresponding to content attributes of a predetermined priority as the first screen component meeting the specified condition.

According to various embodiments, the displaying of the first identifier object in the first order may include determining a screen component of less than a specified size among at least one screen component included in the any screen as the first screen component meeting the specified condition.

According to various embodiments, the displaying of the first identifier object in the first order may include identifying a history of operating at least one screen component included in the any screen and determining a screen component operated over a specified threshold number of times as the first screen component meeting the specified condition.

Figure 7:
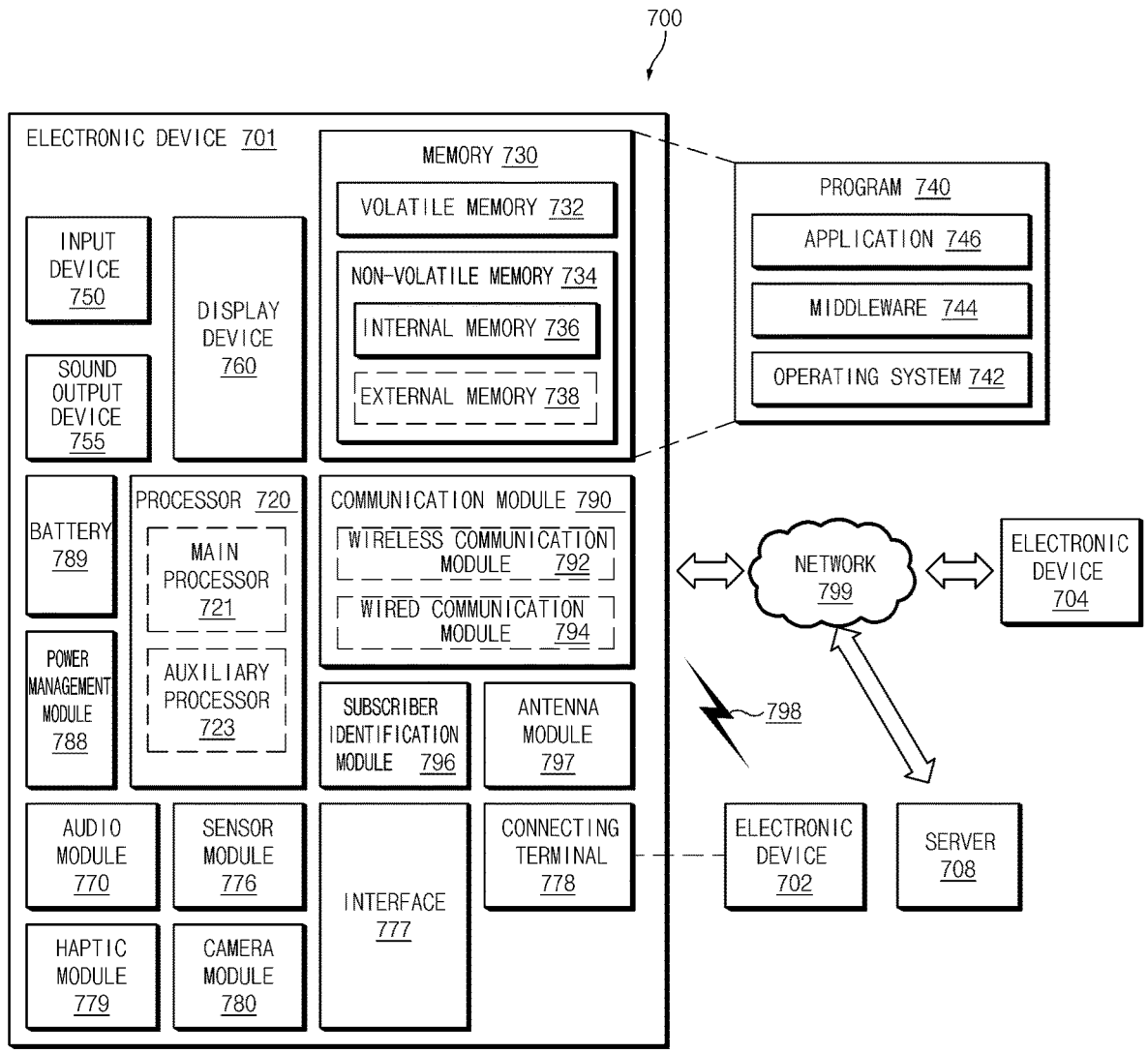
FIG. 7 is a drawing illustrating an electronic device in a network environment according to an embodiment.

FIG. 7 is a diagram illustrating an electronic device in a network environment according to various embodiments.

Referring to FIG. 7, an electronic device 701 (e.g., the electronic device 100 in FIG. 1) may communicate with an electronic device 702 through a first network 798 (e.g., a short-range wireless communication network) or may communicate with an electronic device 704 or a server 708 (e.g., the external server 200 of FIG. 1) through a second network 799 (e.g., a long-distance wireless communication network) in a network environment 700 (e.g., the network 300 of FIG. 1). According to an embodiment, the electronic device 701 may communicate with the electronic device 704 through the server 708. According to an embodiment, the electronic device 701 may include a processor 720 (e.g., the processor 150 of FIG. 1), a memory 730 (e.g., the memory 130 of FIG. 1), an input device 750 (e.g., the voice input receiving unit 120 of FIG. 1), a sound output device 755, a display device 760, an audio module 770, a sensor module 776, an interface 777, a haptic module 779, a camera module 780, a power management module 788, a battery 789, a communication module 790 (e.g., the communication device 110 of FIG. 1), a subscriber identification module 796, or an antenna module 797. According to some embodiments, at least one (e.g., the display device 760 or the camera module 780) among components of the electronic device 701 may be omitted or one or more other components may be added to the electronic device 701. According to some embodiments, some of the above components may be implemented with one integrated circuit. For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one of other components (e.g., a hardware or software component) of the electronic device 701 connected to the processor 720 and may process or compute a variety of data. According to an embodiment, as a part of data processing or operation, the processor 720 may load a command set or data, which is received from other components (e.g., the sensor module 776 or the communication module 790), into a volatile memory 732, may process the command or data loaded into the volatile memory 732, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721 or with the main processor 721. Additionally or alternatively, the auxiliary processor 723 may use less power than the main processor 721, or is specified to a designated function. The auxiliary processor 723 may be implemented separately from the main processor 721 or as a part thereof.

The auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723.

The memory 730 may store a variety of data used by at least one component (e.g., the processor 720 or the sensor module 776) of the electronic device 701. For example, data may include software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may receive a command or data, which is used for a component (e.g., the processor 720) of the electronic device 701, from an outside (e.g., a user) of the electronic device 701. The input device 750 may include, for example, a microphone, a mouse, a keyboard, or a digital pen (e.g., a stylus pen).

The sound output device 755 may output a sound signal to the outside of the electronic device 701. The sound output device 755 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 760 may visually provide information to the outside (e.g., the user) of the electronic device 701. For example, the display device 760 may include a display, a hologram device, or a projector and a control circuit for controlling a corresponding device. According to an embodiment, the display device 760 may include a touch circuitry configured to sense the touch or a sensor circuit (e.g., a pressure sensor) for measuring an intensity of pressure on the touch.

The audio module 770 may convert a sound and an electrical signal in dual directions. According to an embodiment, the audio module 770 may obtain the sound through the input device 750 or may output the sound through the sound output device 755 or an external electronic device (e.g., the electronic device 702 (e.g., a speaker or a headphone)) directly or wirelessly connected to the electronic device 701.

The sensor module 776 may generate an electrical signal or a data value corresponding to an operating state (e.g., power or temperature) inside or an environmental state (e.g., a user state) outside the electronic device 701. According to an embodiment, the sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support one or more designated protocols to allow the electronic device 701 to connect directly or wirelessly to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702). According to an embodiment, the connecting terminal 778 may include, for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. According to an embodiment, the haptic module 779 may include, for example, a motor, a piezoelectric element, or an electric stimulator.

The camera module 780 may shoot a still image or a video image. According to an embodiment, the camera module 780 may include, for example, at least one or more lenses, image sensors, image signal processors, or flashes.

The power management module 788 may manage power supplied to the electronic device 701. According to an embodiment, the power management module 788 may be implemented as at least a part of a power management integrated circuit (PMIC).

The battery 789 may supply power to at least one component of the electronic device 701. According to an embodiment, the battery 789 may include, for example, a non-rechargeable (primary) battery, a rechargeable (secondary) battery, or a fuel cell.

The communication module 790 may establish a direct (e.g., wired) or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the direct (e.g., wired) communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module). The corresponding communication module among the above communication modules may communicate with the external electronic device through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 792 may identify and authenticate the electronic device 701 using user information (e.g., international mobile subscriber identity (IMSI)) stored in the subscriber identification module 796 in the communication network, such as the first network 798 or the second network 799.

The antenna module 797 may transmit or receive a signal or power to or from the outside (e.g., an external electronic device). According to an embodiment, the antenna module 797 may include one or more antennas. For example, the communication module 790 may select one antenna suitable for a communication method used in the communication network such as the first network 798 or the second network 799. The signal or power may be transmitted or received between the communication module 790 and the external electronic device through the selected one antenna.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by one or more external electronic devices among the external electronic devices 702, 704, or 708. For example, when the electronic device 701 performs some functions or services automatically or by request from a user or another device, the electronic device 701 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 701. The electronic device 701 may provide the result as is or after additional processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 740) including an instruction stored in a machine-readable storage medium (e.g., an internal memory 736 or an external memory 738) readable by a machine (e.g., the electronic device 701). For example, the processor (e.g., the processor 720) of a machine (e.g., the electronic device 701) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A display apparatus comprising:
a display;
a voice input receiver configured to receive a user voice input;
a communication circuitry; and
a processor configured to:
based on at least one first component among a plurality of components included in a screen having met a first condition, control the display to display at least one first identifier corresponding to the at least one first component on a first area in the screen during a first time such that one of the at least one first identifier is selectable by a first user voice input, and
based on at least one second component among the plurality of components included in the screen having met a second condition while the at least one first identifier is displayed, control the display to display at least one second identifier corresponding to the at least one second component on a second area in the screen during a second time different from the first time, such that one of the at least one second identifier is selectable by a second user voice input.

2. The display apparatus of claim 1, wherein the processor is configured to:
based on one of the at least one first identifier not being selected by the first user voice input during the first time after the at least one first identifier is displayed on the display, control the display to display the at least one second identifier.

3. The display apparatus of claim 1, wherein the processor is configured to:
while the at least one second identifier is displayed on the display, control the display to maintain or exclude the displaying of the at least one first identifier during a second time.

4. The display apparatus of claim 3, wherein the processor is configured to:
while the at least one first identifier is maintained to be displayed on the display, control the display to assign a first display effect to the at least one first identifier.

5. The display apparatus of claim 1, wherein the processor is configured to:
based on one of the at least one first identifier or one of the at least one second identifier being selected by the second user voice input, control the display to assign a second display effect to a component corresponding to a selected first identifier or a selected second identifier.

6. The display apparatus of claim 1, wherein the processor is configured to:
based on one of the at least one first identifier or one of the at least one second identifier being selected by the second user voice input, control the display to display an execution screen associated with a component corresponding to a selected first identifier or a selected second identifier.

7. The display apparatus of claim 1, wherein the processor is configured to:

based on one of the at least one first identifier being selected by the first user voice input during the first time after displaying the at least one first identifier, control the display to exclude the displaying of the at least one second identifier.

8. The display apparatus of claim 7, wherein the processor is configured to:
based on one of the at least one first identifier being selected by the first user voice input during the first time after displaying the at least one first identifier, control the display to display an execution screen associated with a component corresponding to a selected first identifier.

9. The display apparatus of claim 1, wherein the processor is configured to:
control the display to display the at least one first identifier corresponding to the at least one first component among the plurality of components included in a main region of the screen; and
control the display to display the at least one second identifier corresponding to the at least one second component among the plurality of components included in a sub region of the screen.

10. The display apparatus of claim 1, wherein the processor is configured to:
control the display to display the at least one first identifier corresponding to the at least one first component which has a first size among the plurality of components included in the screen; and
control the display to display the at least one second identifier corresponding to the at least one second component which has a second size among the plurality of components included in the screen.

11. A method for operating a speech recognition service in an electronic device, the method comprising:
displaying a screen associated with operating a function of the electronic device;
based on at least one first component among a plurality of components included in the screen having met a first condition, displaying at least one first identifier corresponding to the at least one first component on a first area in the screen during a first time such that one of the at least one first identifier is selectable by a first user voice input; and
based on at least one second component among the plurality of components included in the screen having met a second condition while the at least one first identifier is displayed, displaying at least one second identifier corresponding to the at least one second component on a second area in the screen during a second time different from the first time, such that one of the at least one second identifier is selectable by a second user voice input.

12. The method of claim 11, wherein the displaying of at least one second identifier includes:

based on one of the at least one first identifier not being selected by the first user voice input during the first time after the at least one first identifier is displayed, displaying the at least one second identifier.

13. The method of claim 11, wherein the displaying of at least one second identifier includes:
while the at least one second identifier is displayed, maintaining or excluding the displaying of the at least one first identifier during a second time.

14. The method of claim 13, further comprising:
while the at least one first identifier is maintained to be displayed, assigning a first display effect to the at least one first identifier.

15. The method of claim 11, further comprising:
based on one of the at least one first identifier or one of the at least one second identifier being selected by the second user voice input, assigning a second display effect to a component corresponding to a selected first identifier or a selected second identifier.

16. The method of claim 11, further comprising:
based on one of the at least one first identifier or one of the at least one second identifier being selected by the second user voice input, displaying an execution screen associated with a component corresponding to a selected first identifier or a selected second identifier.

17. The method of claim 11, further comprising:
based on one of the at least one first identifier being selected by the first user voice input during the first time after displaying the at least one first identifier, excluding the displaying of the at least one second identifier.

18. The method of claim 17, further comprising:
based on one of the at least one first identifier being selected by the first user voice input during the first time after displaying the at least one first identifier, displaying an execution screen associated with a component corresponding to a selected first identifier.

19. The method of claim 11, further comprising:
displaying the at least one first identifier corresponding to the at least one first component among the plurality of components included in a main region of the screen; and
displaying to display the at least one second identifier corresponding to the at least one second component among the plurality of components included in a sub region of the screen.

20. The method of claim 11, further comprising:
displaying to display the at least one first identifier corresponding to the at least one first component which has a first size among the plurality of components included in the screen; and
displaying the at least one second identifier corresponding to the at least one second component which has a second size among the plurality of components included in the screen.

* * * * *